(12) United States Patent
Storrs et al.

(10) Patent No.: US 12,509,225 B2
(45) Date of Patent: Dec. 30, 2025

(54) LINKED LOW PITCH STOP FOR TILTING PROPELLERS

(71) Applicant: Archer Aviation, Inc., San Jose, CA (US)

(72) Inventors: Nathan Storrs, Woodinville, WA (US); Jonathan Beno, Bellevue, WA (US)

(73) Assignee: Archer Aviation Inc., San Jose, CA (US)

( * ) Notice: Subject to any disclaimer, the term of this patent is extended or adjusted under 35 U.S.C. 154(b) by 270 days.

(21) Appl. No.: 18/478,980

(22) Filed: Sep. 29, 2023

(65) Prior Publication Data

US 2024/0116629 A1    Apr. 11, 2024

Related U.S. Application Data

(63) Continuation-in-part of application No. 18/098,417, filed on Jan. 18, 2023, now Pat. No. 11,820,499.

(60) Provisional application No. 63/378,680, filed on Oct. 7, 2022, provisional application No. 63/378,536, filed on Oct. 6, 2022.

(51) Int. Cl.
*B64C 29/00* (2006.01)
*B64C 11/32* (2006.01)

(52) U.S. Cl.
CPC .......... *B64C 29/0033* (2013.01); *B64C 11/32* (2013.01)

(58) Field of Classification Search
CPC ...... B64C 29/0033; B64C 27/54; B64C 11/32
See application file for complete search history.

(56) References Cited

U.S. PATENT DOCUMENTS

| | | | |
|---|---|---|---|
| 2,015,150 A * | 9/1935 | Maxwell | B64C 3/385 244/101 |
| 3,404,852 A * | 10/1968 | Sambell | B64C 29/0033 416/142 |
| 5,997,054 A * | 12/1999 | Baudu | F02K 1/766 292/201 |
| 10,301,008 B1 | 5/2019 | Reichert | |
| 10,479,482 B1 | 11/2019 | Kuentzel et al. | |
| 10,640,207 B2 * | 5/2020 | Lee | B64D 35/04 |

(Continued)

FOREIGN PATENT DOCUMENTS

| | | | |
|---|---|---|---|
| GB | 1199595 A * | 7/1970 | ......... B64C 29/0033 |
| WO | 1998022340 A1 | 5/1998 | |
| WO | 2015052459 A1 | 4/2015 | |

OTHER PUBLICATIONS

Notice of Allowance for U.S. Appl. No. 18/098,417, dated Jun. 30, 2023, in the U.S. Patent and Trademark Office.

*Primary Examiner* — Assres H Woldemaryam

(74) *Attorney, Agent, or Firm* — Finnegan, Henderson, Farabow, Garrett & Dunner, LLP

(57) ABSTRACT

A tilt propeller for a vertical takeoff and landing (VTOL) aircraft includes a linked low pitch stop (LLPS). The LLPS serves as a secondary pitch control system that is activated when a primary pitch control system fails. The LLPS may include a pitch rod coupled to a propeller blade yoke, and a mechanical coupling that correlates the tilt angle of the propeller with a pitch angle setting of the LLPS. The pitch rod may be separated by a gap from the mechanical coupling during normal operation. If the primary pitch control fails, the pitch rod is forced into contact with the mechanical coupling to close the gap and form a load-bearing path to control the pitch angle.

30 Claims, 11 Drawing Sheets

(56) References Cited

U.S. PATENT DOCUMENTS

| | | |
|---|---|---|
| 10,745,122 B2 | 8/2020 | Mullen et al. |
| 10,994,828 B2 | 5/2021 | Reichert |
| 2006/0237581 A1* | 10/2006 | Gerbino .................. B64C 27/32 |
| | | 244/17.11 |
| 2015/0034760 A1 | 2/2015 | Hewitt |
| 2018/0170522 A1 | 6/2018 | De Wergifosse |
| 2018/0339771 A1* | 11/2018 | Oldroyd .............. B64C 29/0033 |
| 2020/0001992 A1 | 1/2020 | Wittke et al. |
| 2020/0189721 A1 | 6/2020 | Maver et al. |
| 2021/0214070 A1 | 7/2021 | Reichert |
| 2022/0396355 A1* | 12/2022 | Depape .................. B64D 27/31 |

* cited by examiner

LINKED LOW PITCH STOP FOR TILTING PROPELLERS

CROSS-REFERENCE TO RELATED APPLICATIONS

This application is a continuation-in-part of U.S. patent application Ser. No. 18/098,417, filed Jan. 18, 2023, and claims the benefit of U.S. Provisional Application No. 63/378,536, filed Oct. 6, 2022, and U.S. Provisional Application No. 63/378,680, filed Oct. 7, 2022, the entire contents of each of which are incorporated by reference for all purposes.

TECHNICAL FIELD

This disclosure relates generally to the field of powered aerial vehicles. More particularly, and without limitation, the present disclosure relates to innovations in tilt-propeller aircraft that use electrical propulsion systems. Certain aspects of the present disclosure generally relate to pitch control systems for tilt propeller blades. Other aspects of the present disclosure generally relate to improvements in propellers that may be used in other types of vehicles but provide particular advantages in aerial vehicles.

SUMMARY

Some embodiments of the present disclosure provide a tilt apparatus of an aircraft. The tilt apparatus may comprise: a first frame; a second frame moveably coupled to the first frame; a propeller coupled to the second frame, the propeller comprising a plurality of propeller blades having a variable pitch; a motor assembly coupled to the second frame and configured to rotate the propeller; a tilt motor configured to tilt the second frame with respect to the first frame between a lift configuration and a cruise configuration; a primary pitch control configured to control a primary pitch angle of the plurality of propeller blades; and a secondary pitch rod configured to mechanically correlate a secondary pitch angle of the plurality of propeller blades to a tilt angle of the propeller.

Some embodiments of the present disclosure provide a tilt method of a vertical takeoff and landing (VTOL) craft. The tilt method may comprise: tilting a second frame of a tilt apparatus with respect to a first frame of the tilt apparatus between a lift configuration and a cruise configuration, the second frame being moveably coupled to the first frame; controlling a primary pitch angle of a plurality of propeller blades of the tilt apparatus using a primary pitch control; and mechanically correlating a secondary pitch angle of the plurality of propeller blades to a tilt angle of the tilt apparatus using a secondary pitch rod. The tilt apparatus employed in the tilt method may comprise the tilt apparatus discussed above.

BRIEF DESCRIPTIONS OF THE FIGURES

DETAILED DESCRIPTION

Figure 1A:
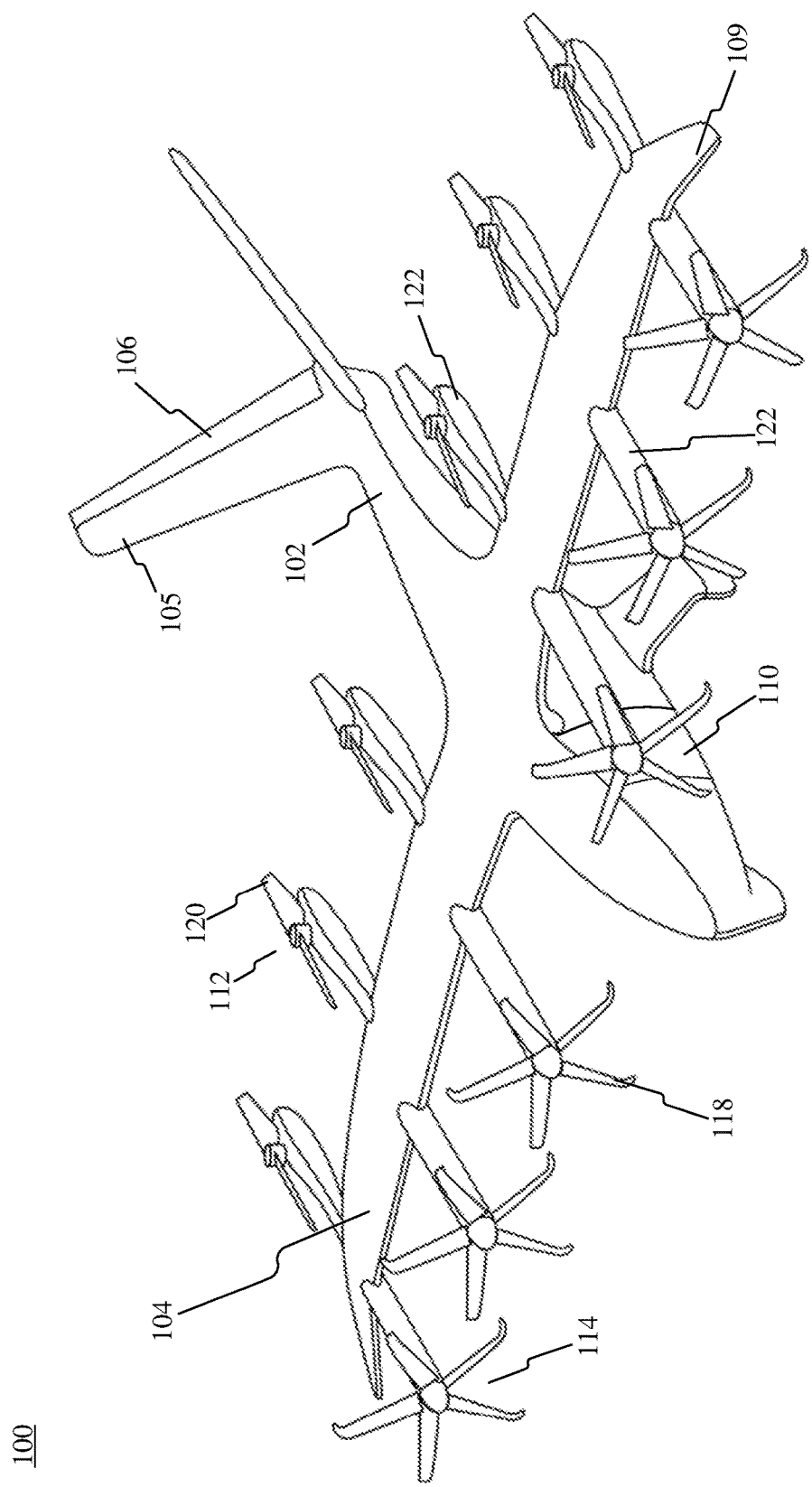
FIG. 1A illustrates an example VTOL aircraft in a cruise configuration, consistent with embodiments of the present disclosure.

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that the aircraft components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the exemplary embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via a tilt propeller subsystem. The tilt propeller subsystem may redirect thrust between a primarily vertical direction during vertical flight mode to a mostly horizontal direction during forward-flight mode. In some embodiments, the transition mode of flight may be utilized for more than a brief change between lift and cruise. For example, tilt propellers may be maintained at intermediate angles between substantially horizontal and substantially vertical, in combination with operating the lift propellers or independently of them. This may allow the aircraft to travel at speeds well below the stall speed of a comparably sized conventional airplane, and to move seamlessly above and below such a speed without any disruption to the passenger experience. A variable pitch mechanism may change the forward electrical engine's propeller-hub assembly blade collective pitch angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from a Flight Control System (FCS) over a digital communication interface to each electric engine. Embodiments may include forward electric engines, and may be able to alter their orientation, or tilt. Additional embodiments may include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust. Some embodiments may include a transition from vertical flight to horizontal flight and vice-versa. In some embodiments, the transitions may be accomplished via the tilt propeller system (TPS). The TPS may redirect thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configuration such that the tilt propellers provide horizontal thrust for wing-borne take-off, cruise and landing. The aft electric engines are not used for generating thrust during a CTOL mission and the aft propellers are stowed in place.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, liquid-cooling, or a combination of both.

For example, a configuration of an electrical engine may include a motor and inverter wherein the motor is in between the propeller of the aircraft and the inverter. Additionally, the motor may include a gearbox. Further, an inverter may share the same central axis as the motor wherein the inverter may be located in an enclosure that is cantilevered off of the rear of the motor and may be air cooled. It is recognized that such an inverter orientation may not be an optimum configuration in terms of the enclosure required to achieve such a cantilevered orientation. Additionally, a motor in this configuration utilizing air cooling may comprise potting material and air fins to assist with cooling of the motor, which may lead to an even larger increase in mass of the system.

Some embodiments may include an electrical engine, wherein inverter modules may be mounted on the outside of a motor enclosure. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator enclosure, a wound stator assembly, a rotor, various bearings, and any additional components required to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a combination of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than an engine only used in one orientation.

Certain flight design considerations take on a special importance in the field of electric and VTOL aircraft. For example, it may be important in VTOL design to configure systems such that they are as lightweight, fail-safe, and energy efficient as possible. Therefore, it may be desirable to configure systems with a simple and robust design, for example by eliminating heavy actuators, power sources, and control components. Such simplifications may serve the dual purposes of reducing weight and eliminating failure points. These design considerations may be important as a matter of general safety. But additionally, in an emerging technological field where regulations are uncertain and evolving, it may be desirable to maximize safety and simplicity to ensure a high probability of regulatory approval or compliance.

The design considerations above may apply not only to primary control systems, but also to back-up, or secondary, systems. For example, it may be desirable to provide a simple and robust back-up system for controlling the blade pitch of a variable-pitch tilt propeller in VTOL aircraft. The back-up control system may be configured to prevent the blade pitch from dropping below a desired threshold in the event that a primary pitch control fails. Therefore such systems may be referred to as a low pitch stop. In general, such a system may be referred to herein as a secondary pitch control.

Embodiments of the present disclosure may provide a tilt apparatus having a passive secondary pitch control that may be lightweight, fail-safe, and may require little or no dedicated power or control components. Using the secondary pitch control, a secondary pitch angle for each tilt propeller may be mechanically correlated to the tilt angle of the tilt propeller. Stated another way, the tilt angle and the secondary pitch angle may be considered as correlated to each other because one angle is constrained as a function of the other. This constraint is achieved by a mechanical system, as discussed below, so the two angles are mechanically correlated. The coupling may set the secondary pitch angle according to a secondary pitch schedule. A secondary pitch schedule may refer to a relationship that determines the secondary pitch angle as a function of the propeller tilt angle. The secondary pitch schedule may comprise pitch values that are lower than those of a primary pitch schedule of a primary pitch control to avoid any conflict between the primary and secondary pitch controls. Thus, during normal operation, some components of the secondary pitch control may move according to a secondary pitch schedule without bearing any substantial loads or affecting the propeller blade pitch angle. If the primary pitch control fails, the secondary pitch control may be forced into a load-bearing position in which the propeller blade pitch angle is set according to the secondary pitch schedule.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 1B:
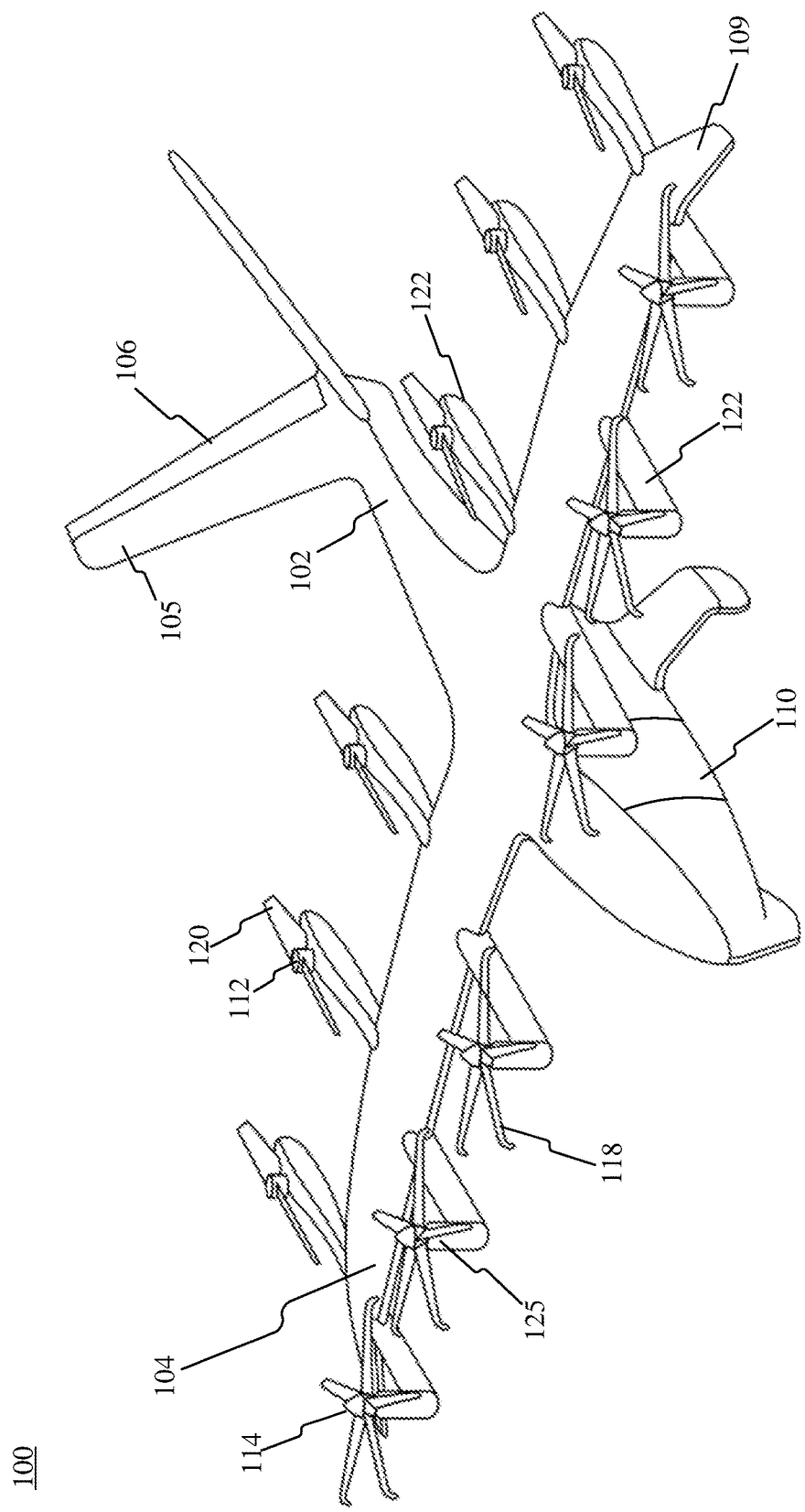
FIG. 1B illustrates an example VTOL aircraft in a lift configuration, consistent with embodiments of the present disclosure.

FIGS. 1A-B illustrate a VTOL aircraft 100 in a cruise configuration and a vertical take-off, landing and hover configuration (also referred to herein as a "lift" configuration), respectively, consistent with embodiments of the present disclosure. The aircraft 100 may include a fuselage 102, wings 104 mounted to the fuselage 102, tail 105, and one or more rear stabilizers 106 mounted to the tail 105 or the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the cruise configuration in which they provide forward thrust to aircraft 100 for horizontal flight, as shown in FIG. 1A, and the lift configuration in which they provide a portion of the lift required for vertical take-off, landing and hovering, as shown in FIG. 1B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft. Alternatively, a cruise configuration may refer to a configuration in which a lift propeller is stowed.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed downwardly for providing additional lift.

For forward flight, tilt propellers 114 may tilt from their lift configurations to their cruise configurations. In other words, the blade pitch angle and tilt angle of tilt propellers 114 may be varied from an orientation in which the tilt propeller thrust is directed downward (to provide lift during vertical take-off, landing and hover) to an orientation in which the tilt propeller thrust is directed rearward (to provide forward thrust to aircraft 100). The tilt propellers may tilt about axes that may be perpendicular to the forward direction of the aircraft 100. When the aircraft 100 is in full forward flight during the cruise configuration, lift may be provided entirely by wings 104. Meanwhile, lift propellers 112 may be shut off. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1A. In some embodiments, lift propellers 112 have more than two blades. In some embodiments, tilt propellers 114 include more blades 118 than lift propellers 112. For example, as illustrated in FIGS. 1A-B, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge. Tilt propeller 114 may be mounted to boom 122 such that tilt propeller 114 is aligned with the body of boom 122 when in the cruise configuration, forming a continuous extension of the front end of boom 122 that minimizes drag for forward flight.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps, ailerons or flaperons. According to some embodiments, the wings may have curved wing tips 109 for reduced drag during forward flight.

In some embodiments, rear stabilizers 106 include control surfaces, such as one or more rudders, one or more elevators, and/or one or more combined rudder-elevators. The wing(s) may have any suitable design. For example, the wings may have a tapering leading edge or a tapering trailing edge. In some embodiments, the wings may have a substantially straight leading edge in the central section of wings 104.

Aircraft 100 may include at least one door 110 for passenger entry and exit. In some embodiments, the door 110 may be located beneath and forward of wings 104 as seen in FIGS. 1A-B.

Further discussion of VTOL aircraft may be found in U.S. Patent Publication No. 2021/0362849, which is incorporated by reference in its entirety.

As discussed above, it may be desirable to provide a robust secondary system for controlling a blade pitch in the event that a primary pitch control fails to operate as designed. However, it may be difficult to achieve this without adding heavy actuators or control devices that consume energy, add weight and introduce too many additional failure points of their own. Embodiments of the present disclosure provide a linked low pitch stop capable of passively setting the propeller blades to a secondary pitch angle upon the failure of a primary pitch control. The secondary pitch angle may be a function of the tilt angle of the propeller blades. By linking the blade pitch to the propeller tilt angle, the design may trade one degree of freedom for more a robust, fail-safe construction.

A. Example Linked Low Pitch Stop Embodiments

Figure 2:
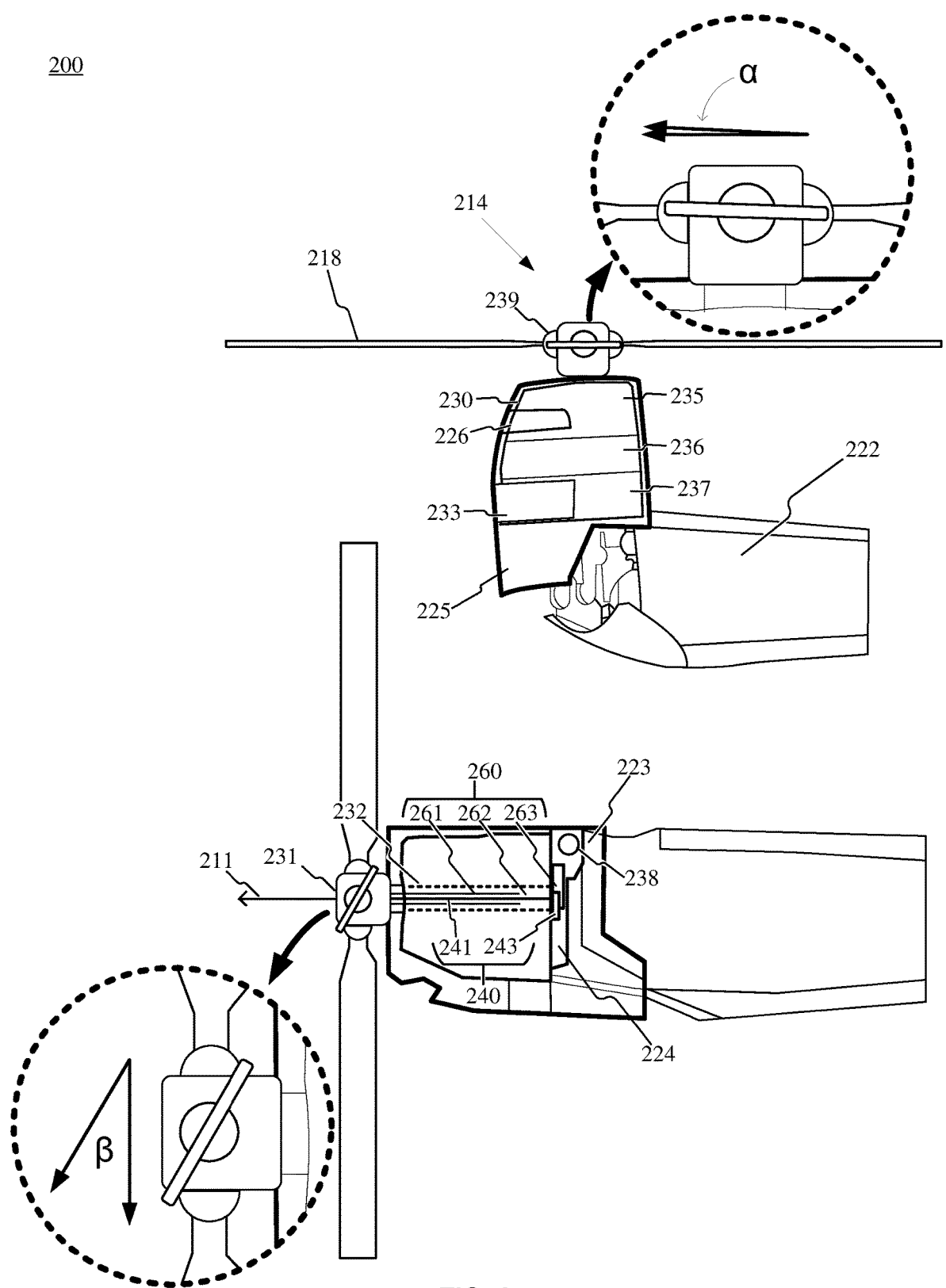
FIG. 2 illustrates an example lift apparatus having a linked low pitch stop, consistent with embodiments of the present disclosure.

FIG. 2 illustrates portions of a tilt apparatus having a linked low pitch stop in a VTOL aircraft 200, consistent with embodiments of the present disclosure. VTOL aircraft 200 may be, e.g., similar to VTOL aircraft 100 of FIGS. 1A-B. Elements in FIG. 2 that are similar to those in FIGS. 1A-B may be labeled with corresponding numbers using 2 as the leading digit. For example, in some embodiments, tilt propeller blades 218 of FIG. 2 may be similar to tilt propeller blades 118 of FIGS. 1A-B.

The tilt apparatus may comprise a tilt propeller 214. The tilt propeller 214 may comprise a plurality of blades 218 coupled to a hub 231 via hub socket 239. Each blade 218 may be configured to have a variable pitch angle. As understood to persons having ordinary skill in the art, the pitch angle of a propeller blade may refer to an angle of rotation about a longitudinal axis of the propeller blade. The pitch angle may comprise an angle between a chord line of the blade and a rotational plane of propeller 214. In the schematic illustrations of FIG. 2, the blades 218 are illustrated as substantially flat, rectangular bodies for simplicity. However, in practice, blades often comprise twists or complex shapes along their lengths. Therefore, the pitch angle may be taken at a predetermined reference chord line of the blade.

As discussed herein, the pitch angle may refer to a collective pitch. Propeller blades may have a "collective" pitch when each blade in a plurality of blades on a propeller remains at a constant pitch angle throughout the full range of propeller rotation (in the absence of any pitch angle adjustment). In some embodiments, each blade on the propeller may have a same collective pitch angle, and a pitch control may control a pitch angle of the plurality of blades. This may be compared to a cyclic pitch, in which the blade pitch changes cyclically during rotation, such that each blade's pitch angle depends on its current angular orientation about the propeller rotation axis. While embodiments of the present disclosure are discussed with respect to collective pitch, it is also possible to configure the propellers as cyclic pitch systems, in which case the pitch angle may vary cyclically around an adjustable reference pitch angle. Therefore, in some embodiments, the pitch angle adjustments discussed below may refer to adjustments of the reference pitch angle of a cyclic pitch system.

Tilt propeller 214 may be coupled to a motor assembly 230 configured to rotate tilt propeller 214. In some embodiments motor assembly 230 may comprise, e.g., motor 235, gearbox 236, and inverter 237. Tilt propeller 214 may further comprise a nacelle 225 around motor assembly 230. Nacelle 225 may comprise an air inlet 226 configured to direct an airflow to a heat exchanger 233 that is thermally coupled to motor assembly 230.

Tilt propeller 214 and motor assembly 230 may be coupled to, and supported on, a second frame 224. Second frame 224 may comprise a mounting structure for motor assembly 230, tilt propeller 214 and related components. Second frame 224 may be moveably coupled to a first frame 223. First frame 223 may comprise a structural component of VTOL aircraft 200. For example, first frame 223 may comprise a portion of a boom 222. Alternatively or additionally, first frame 223 may comprise a portion of, e.g., a fuselage, wing, or tail, such as fuselage 102, wings 104, or tail 105 of VTOL aircraft 100. Second frame 224 may be tiltable with respect to first frame 223 by tilt actuator 238. While tilt actuator 238 is schematically illustrated at a hinge line between first frame 223 and second frame 224, tilt actuator 238 may may comprise, e.g., a rotary actuator, a linear actuator configured to move second frame 224 about a hinge or other rotary support, or any other suitable actuator. Tilt actuator 238 may include, e.g., an electric actuator, hydraulic actuator, etc. Tilt actuator 238 may be configured to rotate tilt propeller 214 (as well as motor assembly 230 or other components) between the cruise, transition, and lift configurations. For example, a rotational axis 211 of tilt propeller blades 218 may be substantially horizontal in the cruise configuration and substantially vertical in the lift configuration. For example, while tilt propeller 214 is illustrated in FIG. 2 as being vertical in the lift configuration such that rotational axis 211 is substantially, e.g., 90 degrees from a horizontal axis of the aircraft, in some embodiments the full tilt range may be higher. For example, in some embodiments tilt actuator 238 may be configured to rotate tilt propeller 214 by an angle of, e.g., 100 degrees, 110 degrees, or 120 degrees from the horizontal axis of the aircraft.

As seen in the enlarged portion at the top of FIG. 2, when tilt propeller 214 is in a lift configuration, it may be desirable to set propeller blades 218 to a very low pitch angle α, such as zero or close to zero. A low pitch angle may be desired in the lift configuration to produce maximum thrust. Note that due to the complexity of blade surfaces, as discussed above, the value of α may be a nominal value or may be taken with respect to a reference chord line. As seen in the further enlarged portion at the bottom of FIG. 2, when tilt propeller 214 is in a cruise configuration during wing-borne flight, it may be more desirable optimize the propeller blades for maximum efficiency. Therefore propeller blades 218 may be set to a high pitch angle β such as, e.g., between 17 and 24 degrees. Note that the optimal pitch angle at cruise for a given vehicle will depend on many factors. Finally, for transitional tilt angles of tilt propeller 214, the optimal pitch angle may comprise intermediate values between α and β. In some embodiments, a substantially continuous curve representing all optimal pitch angles as a function of propeller tilt angle may form a primary pitch schedule.

The pitch angle of propeller blades 218 may be actuated by primary pitch control 240. As further described below, in some embodiments, primary pitch control 240 may comprise a linked tilt pitch system having a design that is similar to the secondary pitch control (linked low pitch stop) 260 described later. However, embodiments of the present disclosure are not limited to this. In general, primary pitch control 240 may comprise, e.g., an electric actuator, a hydraulic actuator, a propeller governor, or any other known pitch control mechanism. Therefore, primary pitch control 240 may be disclosed as a linked tilt pitch system in this application to serve two purposes: first, it may help to illustrate how the two passive systems may be arranged together in some embodiments of the present disclosure; second, it serves to illustrate further alternative configurations that may be equally applicable to the secondary pitch control 260. For example, in some embodiments as described below, the system described as primary pitch control 240, or components of it, may instead be configured as a secondary pitch control 260.

In some embodiments, primary pitch control 240 may comprise a primary pitch rod 241 configured to pass through motor assembly 230, as seen at the bottom of FIG. 2. Primary pitch rod 241 may couple to a propeller blade yoke (not shown in FIG. 2) inside hub 231. The propeller blade yoke may in turn be moveably coupled to each propeller blade. Movement of the propeller blade yoke in the axial direction may alter the pitch angles of the propeller blades. During normal operation, the propeller blade yoke may be actuated by primary pitch rod 241 to set a desired pitch angle. The pitch angle may be determined by a mechanical coupling 243 that correlates the movement of primary pitch rod 241 with a tilt angle set by tilt actuator 238. The mechanical coupling 243 may cause the pitch rod 241 to set the blades 218 to a pitch angle of, e.g., β when the tilt actuator 238 has moved tilt propeller 214 to the cruise configuration. The mechanical coupling 243 may cause the pitch rod 241 to set the blades 218 to a pitch angle of, e.g., α when the tilt actuator has moved tilt propeller 214 to the lift configuration.

In some embodiments, the mechanical coupling 243 may comprise a cam. The cam may be configured to rotate along with tilt actuator 238. An outer edge of the cam may push against a follower to engage with primary pitch rod 241. The cam profile may be designed according to the primary pitch schedule, so that the follower pushes primary pitch rod 241 to the correct pitch angle for any given tilt angle of the tilt actuator 238. In this way, primary pitch rod 241 may mechanically correlate the primary pitch angle of the plurality of propeller blades 218 to the tilt angle of the propeller 214. Further discussion of linked tilt pitch systems may be found in U.S. patent application Ser. No. 18/098,417.

Similarly, secondary pitch control 260 may comprise a secondary pitch rod 261 that passes through a shaft 232 of motor assembly 230 into hub 231 of tilt propeller 214. In some embodiments, secondary pitch rod 261 may comprise a hollow tube surrounding primary pitch rod 241. The secondary pitch rod 261 may be fixed to the propeller blade yoke. During normal operation, when the propeller blade yoke is controlled by primary pitch control 240, secondary pitch rod 261 may simply move passively along with the propeller blade yoke without bearing any substantial mechanical load. However, if the primary pitch control 240 fails (for example, a primary pitch rod 241 may shear, a connection to the blade yoke may break, an electric actuator may fail, a hydraulic fluid line may burst or leak, etc.), the propeller blades may no longer be supported at the desired pitch angle. Instead, the moment exerted on propeller blades 218 by the rotation and external airflow may force the propeller blades toward a lower pitch angle. In doing so, the propeller yoke may press the secondary pitch rod into a load-bearing arrangement to set the blades at the secondary pitch angle.

For example, secondary pitch control 260 may comprise a secondary mechanical coupling 263 that is capable of linking the movement of secondary pitch rod 261 to the tilt angle set by tilt actuator 238. However, during normal operation, this secondary mechanical coupling 263 may be separated from secondary pitch rod 261 by a gap 262. In normal operation, when secondary pitch rod 261 is separated from the secondary mechanical coupling 263 by the gap 262, the secondary mechanical coupling 263 may not substantially actuate secondary pitch rod 261. But when primary pitch control 240 fails, secondary pitch rod 261 may be forced to close the gap 262 and engage with the secondary mechanical coupling 263 to form a load-bearing path. This may allow the secondary mechanical coupling 263 to actuate secondary pitch rod 261 to control the pitch angle of blades 218. For example, secondary pitch rod 261 may set the blades 218 to a pitch angle of, e.g., $β_1$ whenever the tilt actuator 238 has moved tilt propeller 214 to the cruise configuration. $β_1$ may equal, e.g., β minus some small but appreciable margin. By spacing apart the elements of secondary pitch control 260 with the gap 262, the secondary pitch control 260 may be configured to set the propeller blades 218 to the secondary pitch angle only when the primary pitch control fails to maintain the propeller blades 218 at the primary pitch angle. In the lift configuration, the pitch angle may be α under both the primary and secondary pitch schedules. For example, a low pitch stop may play a much more important role in the regime of the cruise configuration where the blades are set to a high pitch. At the low pitch side, a hard stop may be arranged to prevent the blades 218 from falling below a predetermined pitch angle (such as, e.g., zero or near zero) regardless of which pitch control is active.

In some embodiments, the difference $β-β1$ may be designed to be larger than what would be necessary simply to prevent the two pitch control systems from interfering with each other. For example, the difference between the primary and secondary pitch schedules may be designed with a large enough margin that it becomes possible to easily discern whether the blades are operating on the primary or secondary pitch schedules. In this way a failure of the primary pitch control, or an activation of the secondary pitch control, can be easily detected by a detector. For example, pitch angle may be detected based on other measured flight parameters, such as by determining a deviation from an expected value of the flight parameters. For example, in some embodiments, the pitch angle may be estimated based on measurements of rotational speed or propeller torque. Therefore, in some embodiments the detector may comprise an integral part of a larger flight control system. In some embodiments, a detector may comprise a dedicated pitch angle sensor, or a sensor configured to detect a closure of gap 262. The size of gap 262 that may be required to confidently articulate such an error measurement may depend in part on the chosen detector configuration.

As mentioned above, the configurations of primary pitch control 240 and secondary pitch control 260 could be reversed. Alternatively, both systems could be configured with the same type of mechanical coupling, e.g., two different cams, or another suitable mechanical coupling. Further, the secondary pitch control 260 may comprise the elements described above, while the primary pitch control 240 may comprise, e.g., a conventional actuator. For example, in some embodiments, the hollow rod configuration of secondary pitch control 260 may be used with a conventional primary pitch control 240, such as by actuating the primary pitch rod 241 with an electric or hydraulic actuator, or by configuring the primary pitch rod 241 as a conduit for delivering hydraulic fluid.

Further details of exemplary embodiments of the present disclosure are discussed with respect to FIGS. 3A-4B.

Figure 3A:
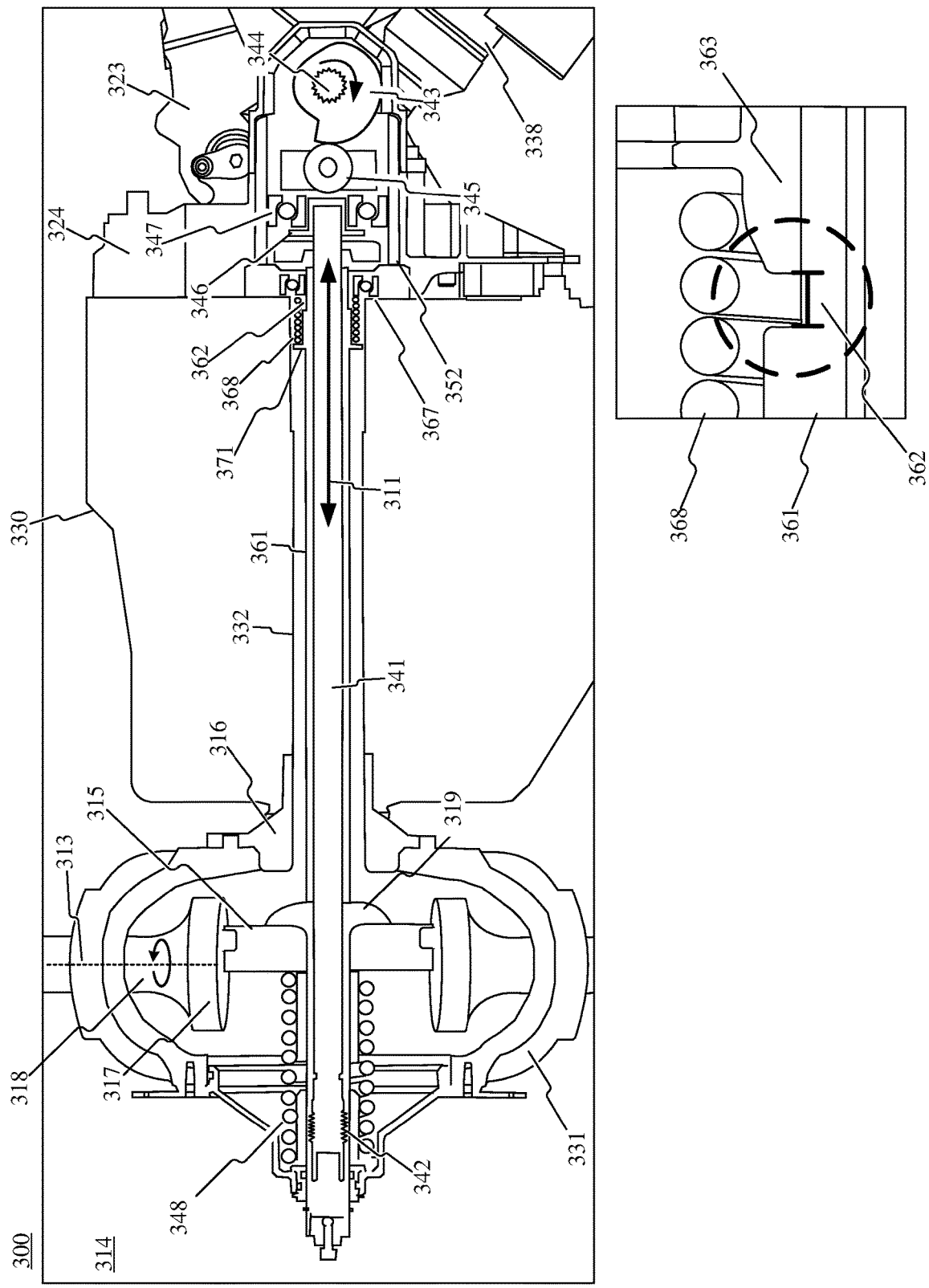
FIGS. 3A-3B illustrate example primary and secondary pitch controls, consistent with embodiments of the present disclosure.
Figure 3B:
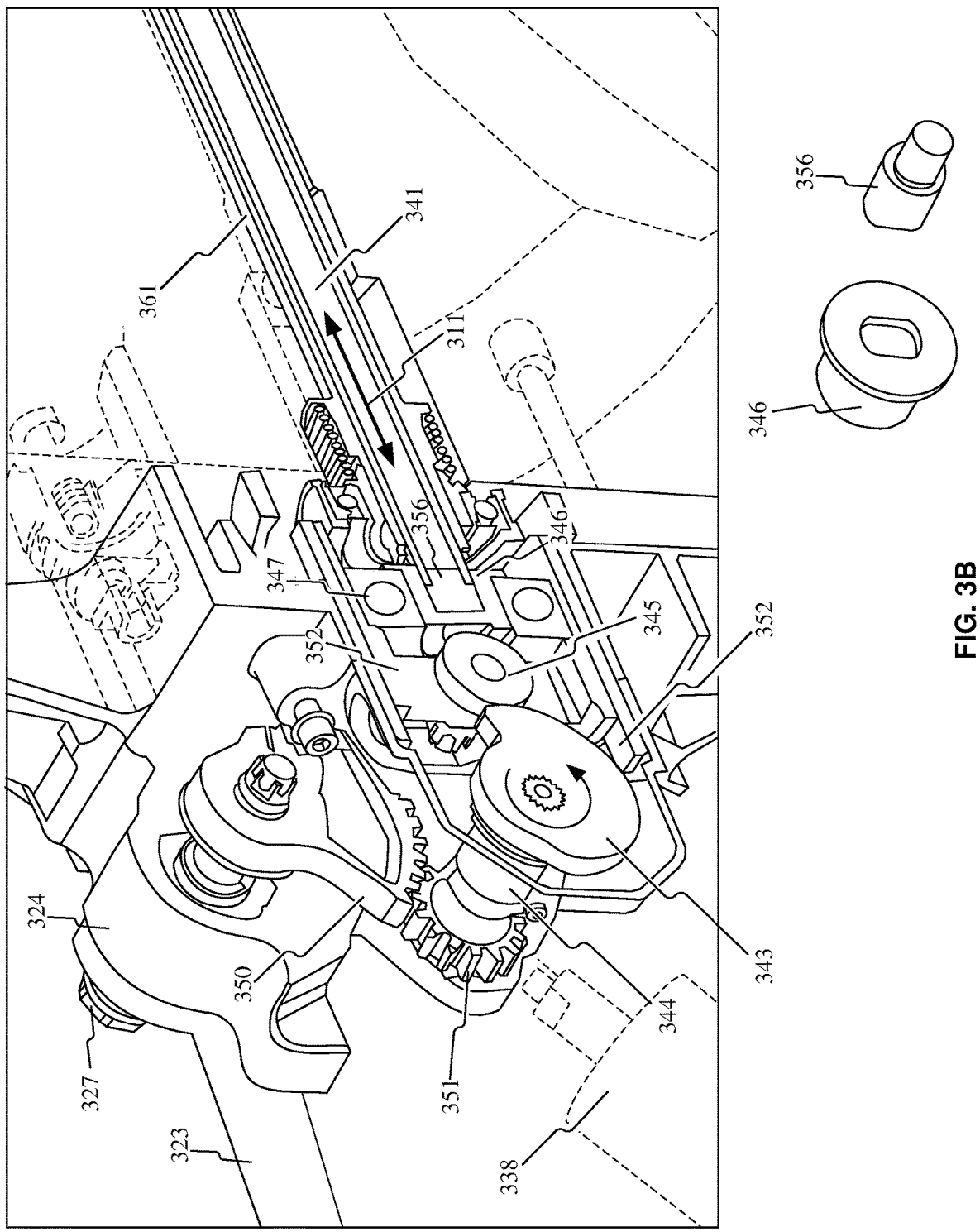

FIGS. 3A-3B illustrate portions of a tilt apparatus having a linked low pitch stop in a VTOL aircraft 300, consistent with embodiments of the present disclosure. VTOL aircraft 300 may be, e.g., similar to VTOL aircraft 100 or 200 of FIGS. 1A-2. Elements in FIGS. 3A-3B that are similar to those in FIGS. 1A-2 may be labeled with corresponding numbers using 3 as the leading digit. For example, in some embodiments, secondary pitch rod 361 of FIGS. 3A-3B may be similar to secondary pitch rod 261 of FIG. 2.

Motor assembly 330 may be configured to rotate a hub 331 by a hub flange 316 that couples motor assembly 330 to hub 331. Propeller yoke 315 may be moveably mounted inside hub 331 such that it can movealong the rotational axis 311 of propeller 314. Propeller yoke 315 may be coupled to each propeller blade, such as by an eccentrically placed pin or projection in a blade actuating cup 317. When the propeller yoke 315 is actuated in the rotational axis 311 direction, propeller blades 318 may be rotated about their longitudinal axes 313 as shown by the circular arrow to alter the pitch angle of propeller blades 318. As illustrated, propeller yoke 315 may be configured to increase the pitch angle by moving axially outward (to the left in FIG. 3A). However, in some embodiments the opposite may be true. For example, propeller yoke 315 may instead be configured to increase the pitch angle by moving axially inward (to the right in FIG. 3A). A preload spring 348 may bias the propeller blades 318 in the low pitch direction to reduce unwanted vibrations.

First, a primary pitch control of tilt propeller 314 will be discussed, consistent with embodiments of the present disclosure. However, as discussed above, in some embodiments the linked tilt pitch system disclosed as a primary pitch control may instead be applied as a linked low pitch stop in the secondary pitch control. For example, a gap could be introduced to the linked tilt pitch system in a manner similar to, e.g., gap 362 and spring 368 discussed below.

As shown in FIG. 3A, the tilt apparatus is in a horizontal cruise configuration, in which the propeller blades 318 may be set to a high pitch angle. As illustrated, a primary pitch rod 341 may be configured to increase the pitch angle by moving linearly outward from motor assembly 330 and deeper into hub 331 (to the left in FIG. 3A) to slide propeller yoke 315 along the axial direction illustrated by double arrows. However, in some embodiments, primary pitch rod 341 may instead be held in tension and configured to increase the pitch angle by moving linearly inward from hub 331 and deeper into motor assembly 330 (to the right in FIG. 3A). Examples of such tension arrangements may be found in U.S. patent application Ser. No. 18/098,417.

Primary pitch rod 341 may be coupled to propeller yoke 315 by, e.g., α thread joint 342 inside a yoke sleeve 319. In some embodiments, the axial position of primary pitch rod 341 may be finely adjusted at thread joint 342 and then locked into pace by, e.g., α locking pin. Primary pitch rod 341 may therefore be configured to spin freely about rotational axis 311 with the rotation of propeller 314. The spinning may be isolated from the second frame 324 by a primary thrust bearing 347. For example, as illustrated in FIG. 3B, an interface pin 356 may be inserted into primary pitch rod 341. Interface pin 356 may fit into an interface cup 346 so that interface cup 346 rotates along with primary pitch rod 341. Interface cup 346 may be coupled to an inner race of primary thrust bearing 347. An outer race of primary thrust bearing 347 may be coupled to a pitch control slider 352 mounted on second frame 324. Thus the interface cup 346, interface pin 356, and primary pitch rod 341 may rotate along with the propeller blades while remaining rotationally decoupled from the second frame 324.

A mechanical coupling such as a cam 343 may be mounted on a cam shaft 344. Cam shaft 344 may be mechanically coupled to a tilt actuator 338 of tilt propeller 314 so that cam shaft 344 turns when tilt propeller 314 is tilted. As shown in FIG. 3B, cam shaft 344 may extend out of the page of FIG. 3A. Cam 343 may comprise an outer profile that corresponds to the primary pitch schedule of propeller blades 318. For example, in FIGS. 3A-3B the blades may be set to a high pitch angle corresponding to a maximum radius of the cam profile. When cam 343 turns, it may actuate a roller 345 mounted on a pitch control slider 352. Pitch control slider 352 may slide primary thrust bearing 347 to linearly actuate primary pitch rod 341 while remaining rotationally isolated from it. As tilt propeller 314 tilts out of the cruise configuration, cam 343 may rotate in the direction indicated by circular arrows to allow primary pitch rod 341 to slide to progressively lower pitch angle settings. Cam 343 may be coupled by cam shaft 344 to a pinion 351. A sector gear 350 may be fixed to the first frame 323. For example, sector gear 350 may be splined onto first frame 323 via connecting shaft 327 and configured to engage pinion 351 on second frame 324. Connecting shaft 327 may form a part of the hinge line about which the second frame 324 tilts with respect to the first frame 323. In some embodiments, sector gear 350 may comprise a clocking adjustment screw or other device for fine tuning the angular orientation of sector gear 350. As the tilt propeller 314 tilts upward, pinion 351 may roll along sector gear 350 to rotate cam shaft 344 and cam 343. The use of cam 343 may allow the propeller blades 318 to be actuated according to complex pitch schedules as a function of the tilt angle of tilt propeller 314.

Next, a secondary pitch control of tilt propeller 314 will be discussed, consistent with embodiments of the present disclosure. The secondary pitch control may comprise a secondary pitch rod 361, as shown in FIGS. 3A and 3B. For example, secondary pitch rod 361 may comprise a hollow tube surrounding primary pitch rod 341. Secondary pitch rod 361 may be fixed to a back end of propeller yoke 315 or yoke sleeve 319 such that it may also spin freely with the rotation of propeller 314. The spinning may be isolated from the second frame 324 by a secondary thrust bearing 367. Secondary thrust bearing 367 may be housed in a fork plate or other mechanical coupling configured to move the thrust bearing as a function of propeller tilt angle. The fork plate may be coupled to the first frame 323 by a drive link. The fork plate and drive link are discussed further below with respect to FIGS. 4A-4B.

Secondary pitch rod 361 may comprise a flanged end 371 configured to accept a spring 368. As seen in the enlarged portion of FIG. 3A, spring 368 may be held by a spring seat 363 on secondary thrust bearing 367. Spring 368 may span a gap 362 between the spring seat 363 and secondary pitch rod 361. Spring 368 may comprise, e.g., a preload compression spring configured to minimize vibrations in the secondary pitch control system. Gap 362 may be designed to absorb the movement of spring seat 363, secondary thrust bearing 367 and other upstream components of the secondary pitch control (such as, e.g., a fork plate or other mechanical coupling). This may ensure that secondary pitch rod 361 does not affect the pitch angle of propeller blades 318 when the primary pitch control is operational.

For example, during normal operation, secondary pitch rod 361 may move along with propeller yoke 215 according to the primary pitch schedule, while spring seat 363 and other components may move according to the secondary pitch schedule. Thus the gap may increase or decrease during movements of the tilt propeller according to a difference between the primary and secondary pitch schedules. Because the secondary pitch rod 361 and spring seat 363 do not contact each other during normal operation, no load path is formed to link the propeller tilt angle with the blade pitch in the secondary pitch control. However, when the primary pitch control fails, forces on the propeller blades 318 (as well as a force from, e.g., preload spring 348) may urge propeller yoke 315 toward a lower pitch angle, pushing secondary pitch rod 361 to the right as viewed in FIG. 3A. In this situation, the gap 362 may be closed so that spring seat 363 is in load-bearing contact with secondary pitch rod 361. Alternatively, a load path may be formed through a fully-compressed spring 368, which also constitutes closing the gap 362 for the purposes of this disclosure. With the load path formed through secondary pitch rod 361, a pitch angle of propeller blades 318 may be actuated according to the secondary pitch schedule.

In some embodiments gap 362 may be designed just large enough such that conflicts between the motion of primary and secondary pitch controls are avoided. In this way, for example, a linear translation of the primary pitch rod 341 may be actuated by movement of a first mechanical coupling such as cam 343, and may be independent of movement of a second mechanical coupling, such as a fork plate or a second cam. Further, a linear translation of the secondary pitch rod 361 may actuated by movement of the second mechanical coupling, and may be independent of the movement of the first mechanical coupling. In some embodiments as discussed above with respect to FIG. 2, gap 362 may be made large enough to detect that the propeller blades have moved from a first pitch angle on the primary pitch schedule to a second pitch angle on the secondary pitch schedule. This detection may be used to determine, e.g., a failure of the primary pitch control, or an activation of the secondary pitch control. Pitch angle may be detected by, e.g., any of the techniques discussed above, such as a detection based propeller speed or torque, by using dedicated pitch sensors, or by a gap sensor configured to detect a closure of gap 362.

Figure 4A:
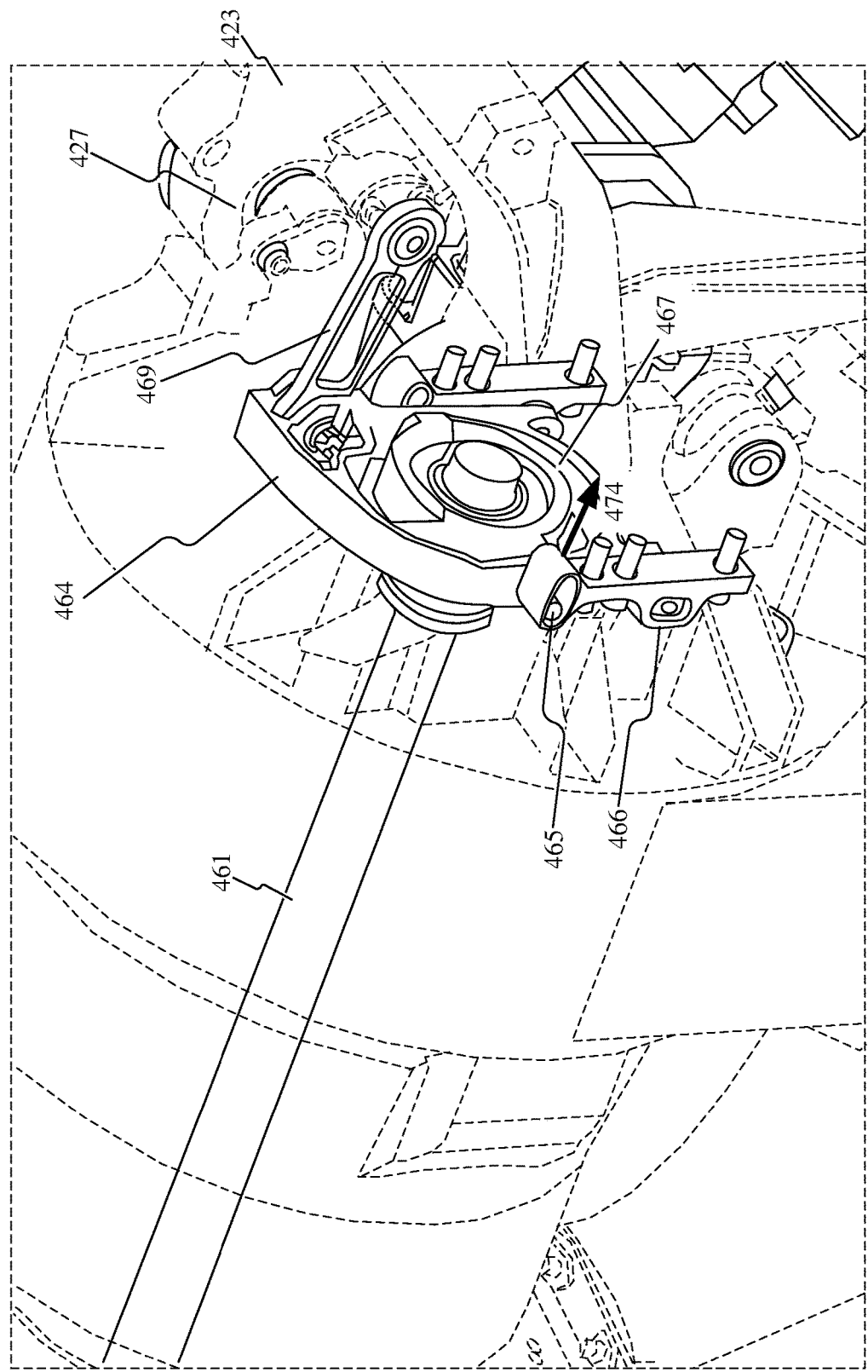
FIGS. 4A-4B illustrate an example fork plate and drive link, consistent with embodiments of the present disclosure.
Figure 4B:
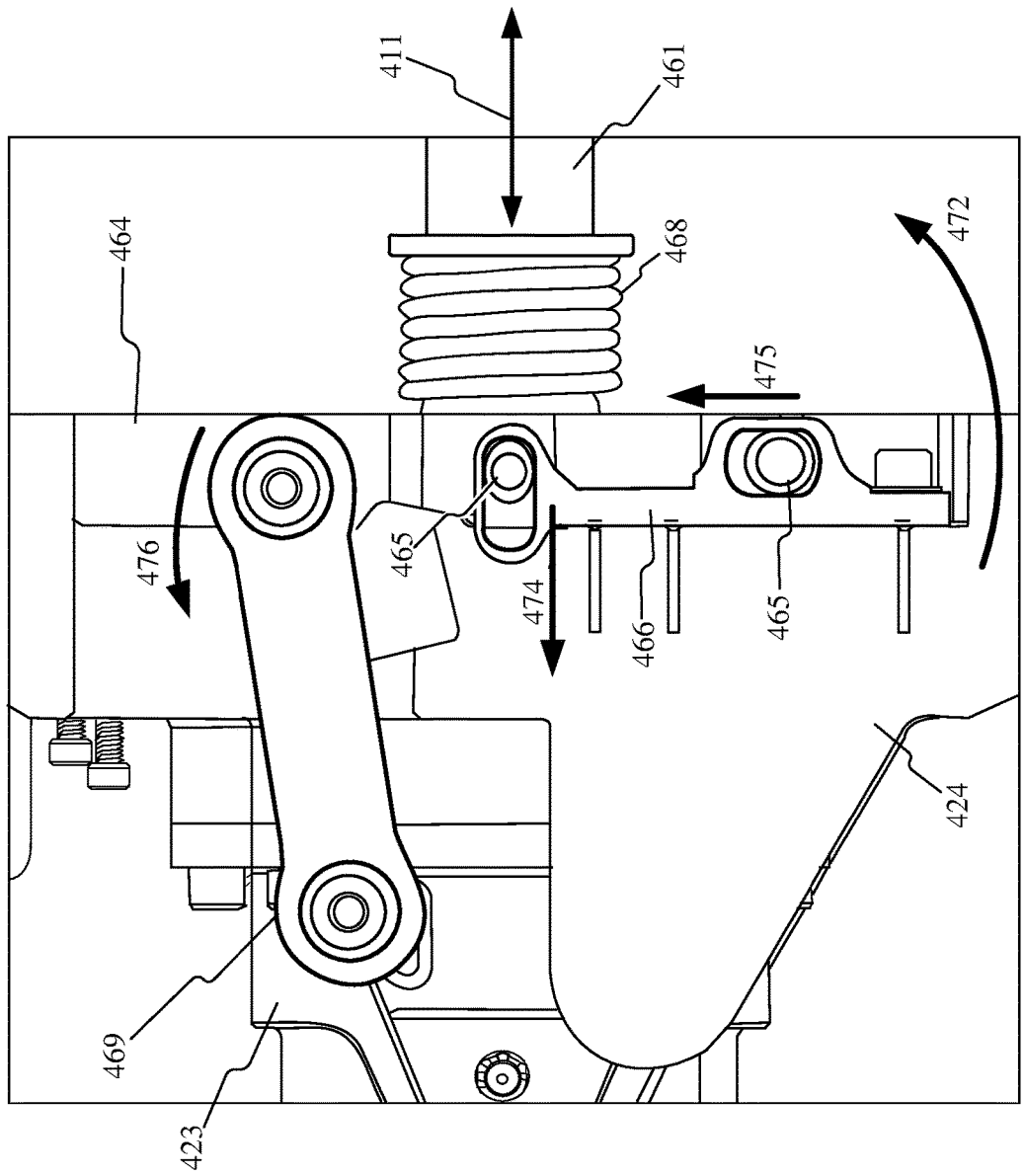

FIGS. 4A-4B illustrate portions of a tilt apparatus having a linked low pitch stop in a VTOL aircraft 400, consistent with embodiments of the present disclosure. VTOL aircraft 400 may be, e.g., similar to VTOL aircraft 100-300 of FIGS. 1A-3B. Elements in FIGS. 4A-4B that are similar to those in FIGS. 1A-3B may be labeled with corresponding numbers using 4 as the leading digit.

FIGS. 4A-4B depict the operation of a fork plate 464 and drive link 469 as a second mechanical coupling. The second mechanical coupling may correlate the secondary pitch angle with a tilt angle of the tilt propeller. As seen in FIG. 4A, fork plate 464 may be configured to moveably support secondary thrust bearing 467. Secondary thrust bearing 467 may comprise a spring seat (such as spring seat 363 of FIG. 3A) or other surface that may be separated from secondary pitch rod 461 by a gap. Fork plate 464 and secondary thrust bearing 467 may be moved according to the secondary pitch schedule by the tilting of second frame 424 with respect to first frame 423.

Fork plate 464 may be coupled to first frame 423 (see FIG. 4B) and second frame 424 (see FIG. 4B). For example, as best seen in FIG. 4B, fork plate 464 may be coupled to the first frame 423 by a drive link 469. In some embodiments, drive link 469 have an adjustable length for tuning the secondary pitch schedule. Fork plate 464 may further be coupled to the second frame 424 at a bracket 466. For example, bracket 466 may be rigidly fixed to second frame 424. Fork plate 464 may comprise pins 465 that may be inserted into the slots of bracket 466. The slots may comprise varying degrees of freedom in different directions as indicated by arrows in FIG. 4B. The slots may be configured to constrain the movement of fork plate 464 according to the secondary pitch schedule.

The various motions of a secondary pitch control will now be described with respect to FIG. 4B. As illustrated in FIG. 4B, the tilt apparatus is in a horizontal cruise position. In the horizontal cruise position, a primary pitch rod (not shown) and secondary pitch rod 461 have been moved to the right along propeller rotations axis 411 into a high pitch setting. When the tilt apparatus tilts up into a lift configuration, second frame 424 may tilt away from first frame 423 along the direction indicated by arrow 472. For example the second frame 424 may rotate about a hinge line (such as pivoting about hinge lines 327 as seen in FIG. 3B or 427 as seen in FIG. 4A). As the second frame 424 rotates away from first frame 423, first frame 423 may pull drive link 469 in the direction shown at arrow 476. Drive link 469 may in turn pull on fork plate 464, whose movement may be constrained by pins 465 projecting from fork plate 464 into slots of bracket 466. For example, an upper pin 465 may be constrained to move in the direction 474 with respect to bracket 466 on second frame 424, while lower pin 465 may be constrained to move in the direction 475 with respect to bracket 466 on second frame 424. Thus, drive link 469 may pull fork plate substantially to the left along rotational axis 411 with respect to second frame 424. This will also pull back the thrust bearing 467 (seen in FIG. 4A) that is supported by fork plate 464. If there has been a failure in a primary pitch control (not shown), secondary pitch rod 461 may be pressed against spring 468 to form a load path through fork plate 464. Therefore, as fork plate 464 is pulled back during the upward tilt, secondary pitch rod may slide along rotation axis to the left as viewed in FIG. 4B, causing a propeller yoke (not shown) to move toward a lower pitch setting. When the tilt apparatus tilts downward into a cruise configuration again, the above motions are reversed and secondary pitch rod may slide back to the right along rotational axis 411, pushing the yoke back to a higher pitch setting Pins 465 may slide along the slots of bracket 466 to produce secondary pitch schedule having a simple curve as discussed below with respect to FIGS. 5A-5D. The types of secondary pitch schedules that may be achieved with the fork plate/drive link system of FIGS. 4A-4B may be of limited complexity. For example, the secondary pitch schedules may comprise a single monotonic curve. However, the design also offers a simple construction with a low probability of failure. Further, a low pitch stop system may be needed only over a relatively small range of tilt angles such as, e.g., 25 degrees or less from the cruise position. This is because a loss of pitch is the most concerning when operating at a high blade pitch in cruise. When pitch control is lost, propeller blades may be forced naturally to a low or zero pitch angle. When this occurs at or near a high-pitch cruise configuration, the pitch change may be drastic and may cause a propeller to overspeed and damage the motor, propeller blades or other components. Therefore, a complex secondary pitch schedule may not be necessary in some embodiments of the present disclosure, and instead a simple pitch schedule designed to function over the lowest, e.g., 25 degrees of tilt may suffice. In such a case, the fork plate/drive link system of FIGS. 4A-4B may offer sufficient pitch control, and its simplicity may offer a more reliable design. In some embodiments, mechanical couplings other than a fork plate may be employed, such as a cam system as discussed above.

By using a configuration according to embodiments above, two passive systems for pitch control may be achieved. For example, the systems may be considered passive because they do not require any dedicated or independent controls. Instead, the propeller blades are designed to change their pitch automatically as a function of the tilt actuation of their respective tilt propeller. Further, the two systems may comprise independent load paths between a second frame 324 of FIG. 3A, and a propeller yoke 315 or other structure inside hub 331. This may ensure a high degree of redundancy for fail-safe pitch control. In some embodiments, a linked low pitch stop may be provided as the second pitch control, while a primary pitch control may comprise a design other than the linked tilt pitch. Nevertheless, the primary pitch control and a secondary pitch control may still be configured with independent load paths between second frame 324 and propeller yoke 315.

In some embodiments, a primary or secondary pitch control may comprise, e.g., α hydraulic actuator. For example, primary pitch rod 341 or secondary pitch rod 361 may comprise a piston for transferring mechanical force from cam 343 or fork plate 464 to propeller yoke 315 by way of a hydraulic fluid. Alternatively or additionally, primary pitch rod 341 or secondary pitch rod 361 may comprise a hydraulic tube configured to contain the hydraulic fluid.

B. Example Tilt Propeller Pitch Schedule Embodiments

FIGS. 5A-5D illustrate example primary and secondary pitch schedules, consistent with embodiments of the present disclosure. The primary and secondary pitch schedules may be employed with, e.g., primary and secondary pitch controls discussed above.

Figure 5A:
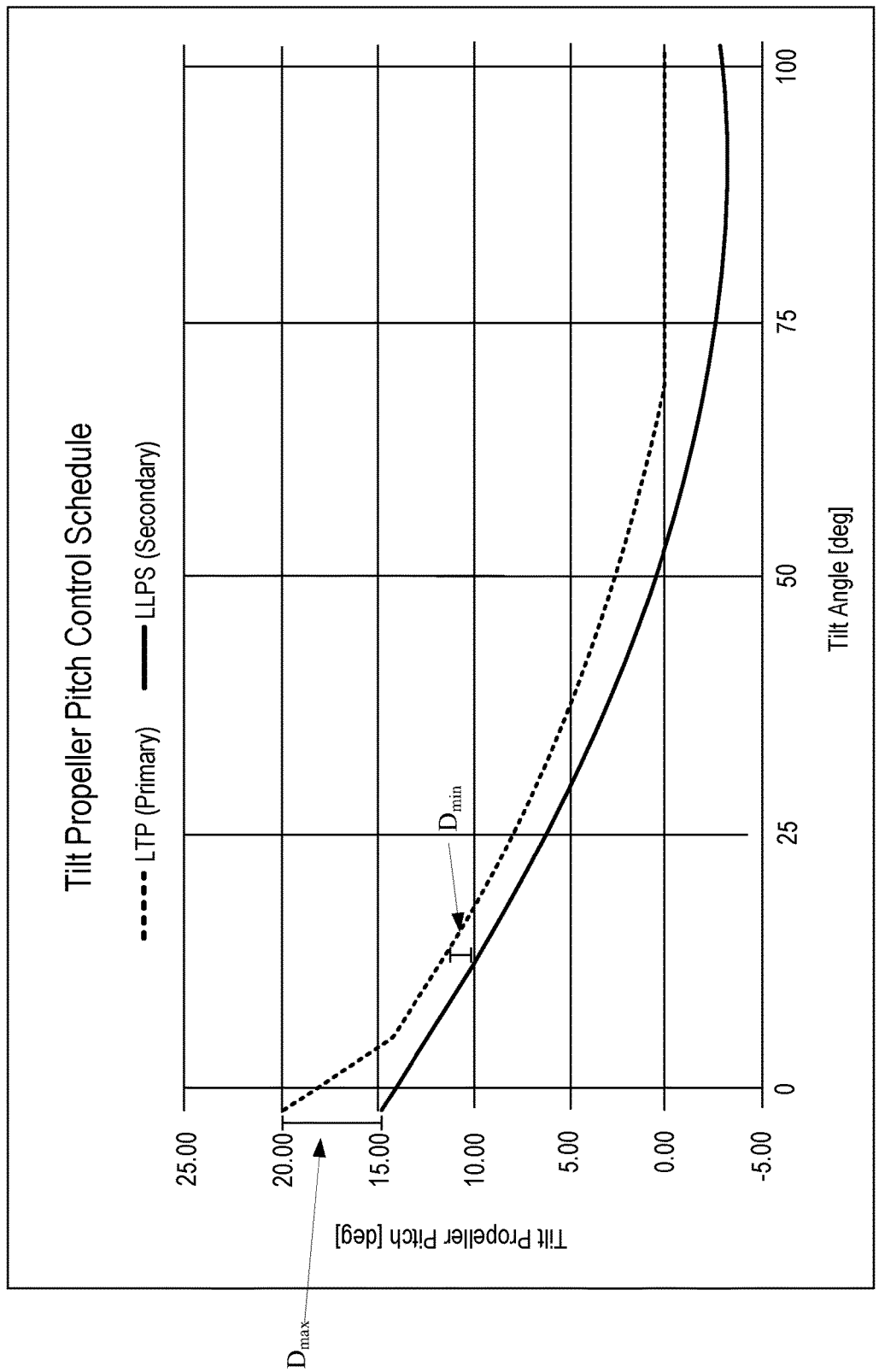
FIG. 5A illustrates a first example primary and secondary pitch schedule, consistent with embodiments of the present disclosure.

FIG. 5A illustrates a first example primary (dashed line) and secondary (solid line) pitch schedule of a control schedule 500A, consistent with embodiments of the present disclosure. The pitch schedule indicates a propeller blade pitch angle as a function of tilt angle over a range of tilt angles between the lift and cruise configuration. The tilt angle may be given with respect to, e.g., a horizontal reference axis of the aircraft. As seen in FIG. 5A, the lift or cruise configurations may not exist precisely at 0 or 90 degrees relative to a horizontal axis of the aircraft in some embodiments. For example, a cruise configuration may comprise a tilt angle below 0 such as, e.g., at approximately −2 degrees relative to the aircraft axis. Further, a tilt propeller axis may be positioned past vertical such as, e.g., approximately 100 degrees, to enable differential tilt for yaw control and backward translation while hovering, as well as to provide deceleration during transition.

The primary pitch schedule may comprise a high pitch angle in a cruise configuration, and curve gradually downward towards a low pitch angle near the lift configuration. For example, the primary pitch angle may bottom out at, e.g., 0 degrees at some point along the primary pitch schedule. For example, the primary pitch schedule of control schedule 500A may reach a constant pitch angle of, e.g., approximately 0 degrees at approximately 70 degrees of tilt. This may correspond to, e.g., a cam profile having a constant radius above the 70-degree mark. Alternatively or additionally, the constant value may correspond to a further hard stop provided in the hub or elsewhere.

The secondary pitch schedule may comprise a slightly lower pitch value in the cruise configuration. For example, as seen in control schedule 500A, at the lowest tilt angle the secondary pitch angle on the secondary pitch schedule may be separated from the primary pitch angle on the primary pitch schedule by, e.g., 5 degrees in the y-axis as seen in the chart. Alternatively, the separation may be, e.g., between 1 and 15 degrees. The secondary pitch schedule may progress along a substantially continuous curve, particularly when the secondary pitch schedule is controlled by a simple mechanical arrangement such as, e.g., the fork plate and drive link discussed above. Meanwhile, the primary pitch schedule may comprise a more complex shape. For example, the primary pitch schedule may comprise an initial sharp drop in pitch between tilt angles of, e.g., −2 and +5 degrees, followed by a more gradual curve between tilt angles of, e.g., 5 and 70 degrees, at which point the tilt propeller pitch angle may remain constant at about 0 degrees. The secondary pitch schedule may therefore comprise a simple curve that is optimized to have minimum and maximum pitch angle difference from the primary curve over a predetermined range of tilt motion. The predetermined range of tilt motion may comprise, e.g., a full range of motion, a critical range, or an intermediate range. For example, a critical range of motion may be identified as, e.g., below 15, below 25 degrees, below 35 degrees, or below 45 degrees of tilt. An intermediate range may be identified as, e.g., between the critical range and 65 degrees, 75 degrees, or 85 degrees of tilt. One example is illustrated using control schedule 500A and selecting a critical range as being below 15 degrees of tilt. Under these conditions, a maximum pitch angle difference $D_{max}$ may be about 5 degrees and a minimum pitch angle difference $D_{min}$ may be about 5 degrees. The maximum and minimum pitch angle difference may be chosen based on a balance of factors such as safety, efficiency, and failure detection. For example, a small pitch angle difference may be desired to ensure safe and efficient operation. However, a slightly larger pitch angle difference may be desired to enable detection of a failure of the primary pitch control (or an activation of the secondary pitch control). Therefore, in some embodiments, the primary and secondary pitch schedules may be configured with a minimum pitch angle difference of, e.g., 1 to 10 degrees over the predetermined range of tilt motion. In some embodiments, the primary and secondary pitch schedules may be configured with a maximum pitch angle difference of, e.g., 5 to 20 degrees over the predetermined range of tilt motion.

Figure 5B:
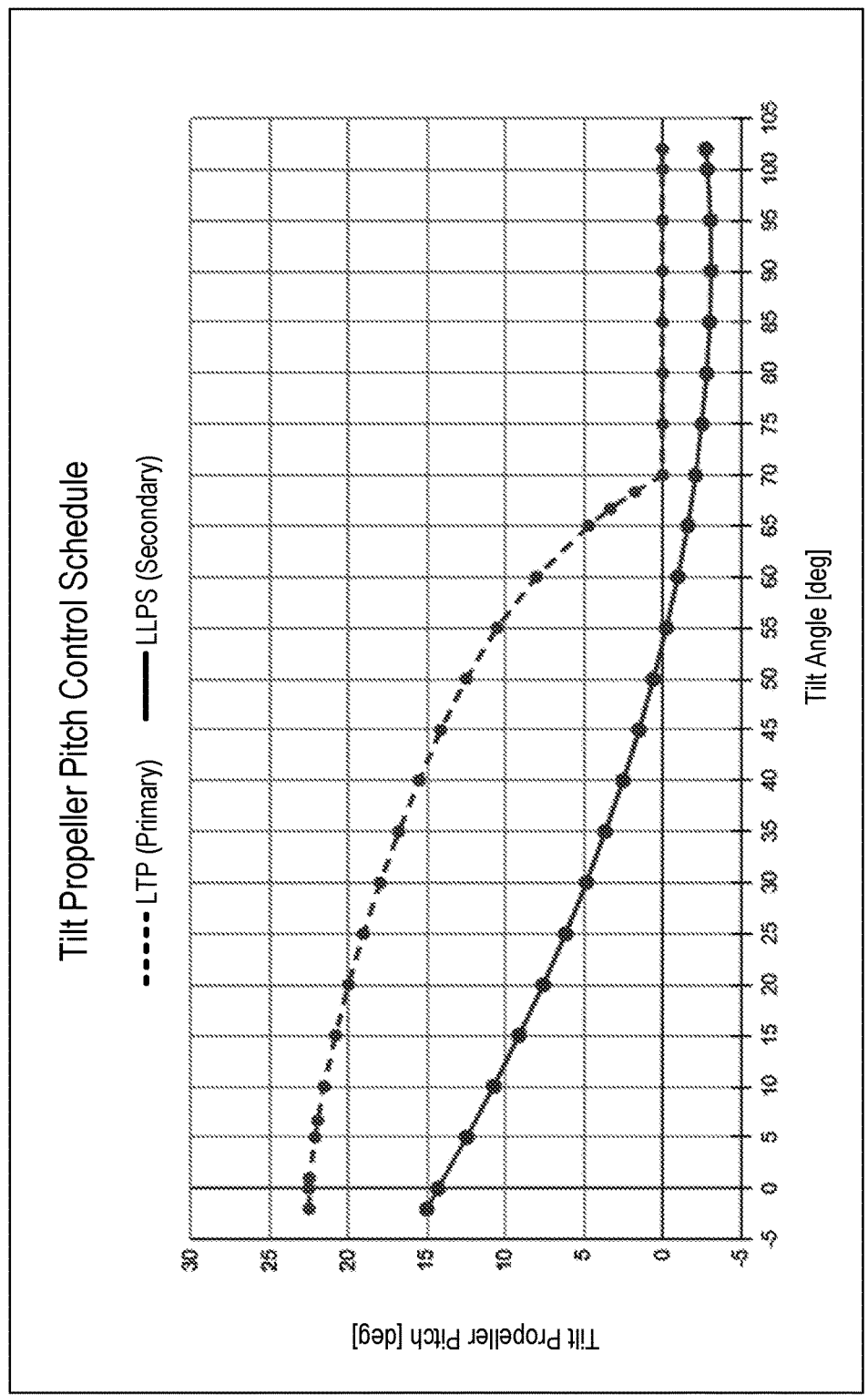
FIG. 5B illustrates a second example primary and secondary pitch schedule, consistent with embodiments of the present disclosure.

In some embodiments, the secondary pitch schedule may not follow the primary pitch schedule as closely. For example, FIG. 5B illustrates a second example primary and secondary pitch schedule of a control schedule 500B, consistent with embodiments of the present disclosure. Here, the primary and secondary pitch schedules may converge and diverge over a range of tilt motion between the cruise and lift configurations. For example, the pitch angle difference may become steadily larger between about −3 degrees and about 40 degrees of tilt, after which the pitch angle difference may become smaller up to about 70 degrees of tilt. Nevertheless, the primary and secondary pitch schedules of control schedule 500B may be configured with minimum and maximum pitch angle differences, over a critical range below 30 degrees of tilt, of e.g., about 7 degrees pitch angle difference (at −3 degrees of tilt) and about 13 degrees pitch angle difference (at 30 degrees of tilt) respectively.

Figure 5C:
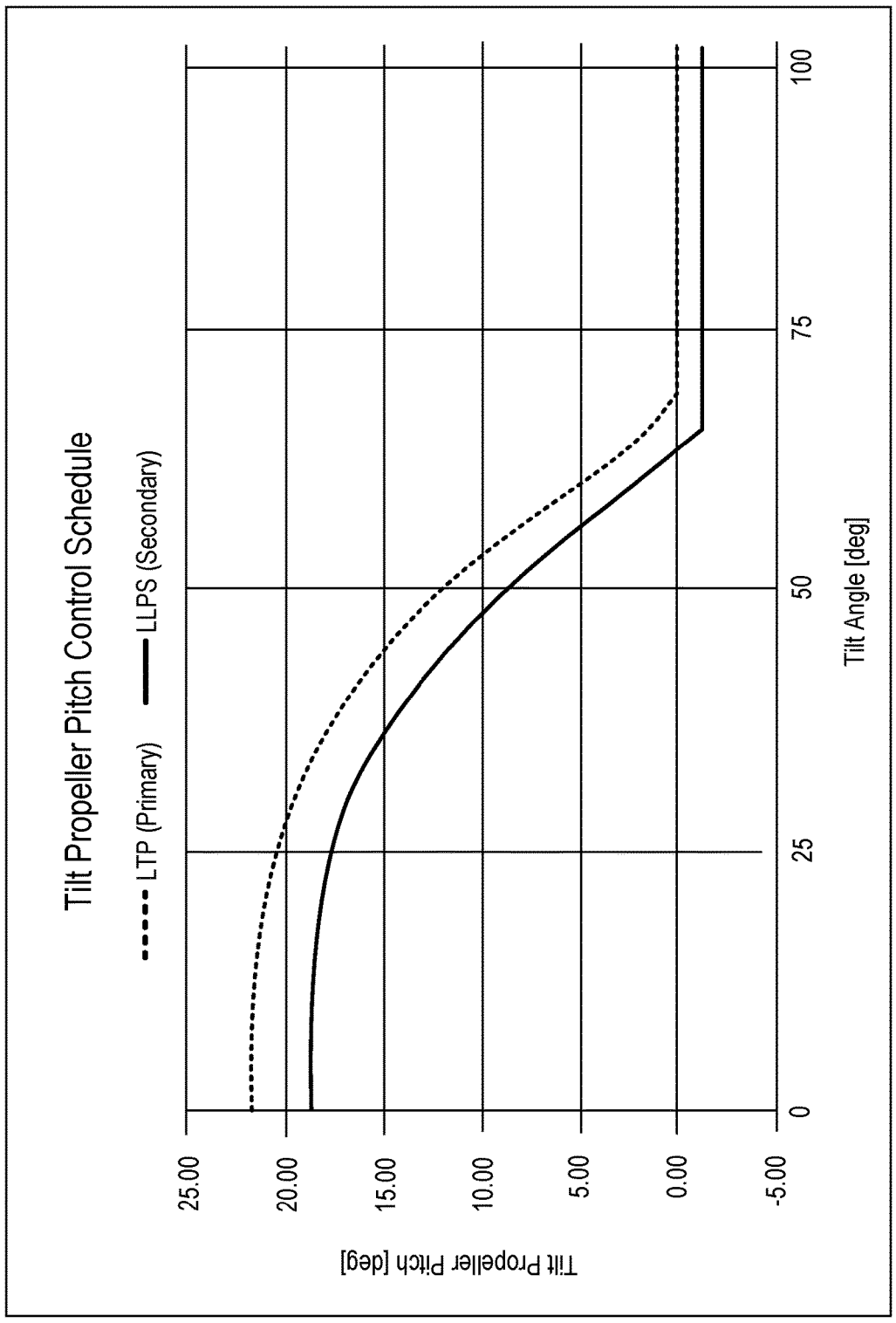
FIG. 5C illustrates a third example primary and secondary pitch schedule, consistent with embodiments of the present disclosure.

In some embodiments, the secondary pitch schedule may follow the primary pitch schedule more closely than control schedule 500A. FIG. 5C illustrates a third example primary and secondary pitch schedule of a control schedule 500C, consistent with embodiments of the present disclosure. Here, both primary and secondary pitch schedules may comprise complex curves that closely match each other. For example, control schedule 500C may correspond to primary and secondary pitch controls having similar configurations, such as by employing two fork plates or two cams. The two fork plates or two cams may comprise the same or similar designs and may have a pitch angle offset of a prescribed amount. In this way propeller blades may be maintained at an approximate desired pitch angle, even in the event of a failure, throughout predetermined range of tilt motion. For example, the primary and secondary pitch schedules of control schedule 500C may be configured with minimum and maximum pitch angle differences of, e.g., about 2 degrees and about 4 degrees respectively.

Figure 5D:
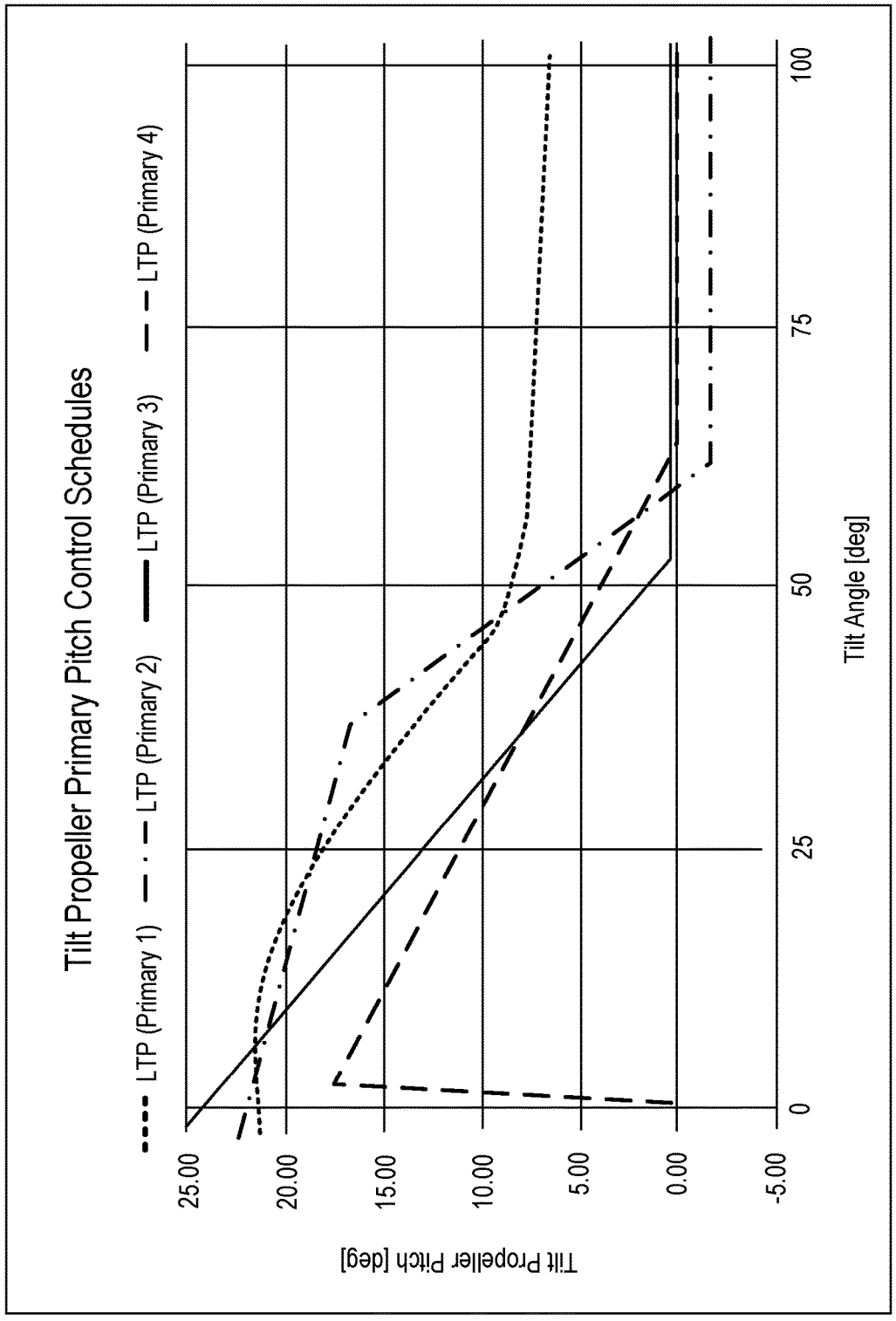
FIG. 5D illustrates a plurality of example primary pitch schedules, consistent with embodiments of the present disclosure.

The different following schemes of secondary pitch schedules illustrated in FIGS. 5A-5C may be applied to any number of different primary pitch control schedules. For example, FIG. 5D illustrates four different primary pitch schedules, consistent with embodiments of the present disclosure. The primary pitch schedules may be similar to, e.g., pitch schedules disclosed in the above-incorporated U.S. patent application Ser. No. 18/098,417. A secondary pitch schedule may be designed to follow any of the primary pitch schedules according to a general matching curve as seen in FIG. 5A, a divergent curve as seen in FIG. 5B, or a closely matching curve as seen in FIG. 5C.

The primary and secondary pitch schedules discussed above are merely examples of possible pitch schedules that may be performed according to embodiments of the present disclosure. Further, it should be noted that primary pitch schedules may represent a planned pitch schedule rather than a mechanical constraint. For example, while a secondary pitch control system may mechanically correlate the tilt angle to a pitch angle according to the secondary pitch schedule, a primary pitch schedule may simply represent the target pitch angles of an active pitch control system, such as an electric or hydraulic actuator.

Embodiments of the present disclosure may further be described by the following clauses:

1. A tilt apparatus of an aircraft, comprising:
a first frame;
a second frame moveably coupled to the first frame;
a propeller coupled to the second frame, the propeller comprising a plurality of propeller blades having a variable pitch;
a motor assembly coupled to the second frame and configured to rotate the propeller;
a tilt motor configured to tilt the second frame with respect to the first frame between a lift configuration and a cruise configuration;
a primary pitch control configured to control a primary pitch angle of the plurality of propeller blades; and
a secondary pitch rod configured to mechanically correlate a secondary pitch angle of the plurality of propeller blades to a tilt angle of the propeller.

2. The tilt apparatus of clause 1 or 2, wherein the primary pitch control comprises one of an electric actuator, a hydraulic actuator, a propeller governor, or a pitch rod.

3. The tilt apparatus of any of clauses 1 to 3, wherein the primary pitch control comprises a primary pitch rod.

4. The tilt apparatus of clause 3, wherein the primary pitch rod is configured to mechanically correlate the primary pitch angle of the plurality of propeller blades to the tilt angle of the propeller.

5. The tilt apparatus of clause 3, wherein:
the primary pitch rod and the secondary pitch rod are concentrically arranged.

6. The tilt apparatus of clause 5, wherein the secondary pitch rod comprises a hollow tube surrounding the primary pitch rod.

7. The tilt apparatus of clause 3, further comprising:
a cam coupled to the second frame and configured to rotate when the tilt motor tilts the second frame;
wherein a linear translation of one of the primary pitch rod or the secondary pitch rod is actuated by rotation of the cam.

8. The tilt apparatus of clause 7, further comprising:
a second cam coupled to the second frame and configured to rotate when the tilt motor tilts the second frame;
wherein a linear translation of the other of the primary pitch rod of the secondary pitch rod is actuated by rotation of the second cam.

9. The tilt apparatus of clause 7, further comprising:
a fork plate coupled to the second frame and configured to be moved when the tilt motor tilts the second frame;
wherein a linear translation of the other of the primary pitch rod or the secondary pitch rod is actuated by movement of the fork plate.

10. The tilt apparatus of clause 3, wherein:
the primary pitch rod is coupled to the second frame by a first mechanical coupling;
the secondary pitch rod is coupled to the second frame by a second mechanical coupling;
a linear translation of the primary pitch rod is actuated by movement of the first mechanical coupling, and is independent of movement of the second mechanical coupling; and
a linear translation of the secondary pitch rod is actuated by movement of the second mechanical coupling, and is independent of movement of the first mechanical coupling.

11. The tilt apparatus of clause 3, wherein:
the primary pitch rod is configured to mechanically correlate the primary pitch angle of the plurality of propeller blades to the tilt angle of the propeller by translation along a rotational axis of the propeller; and the secondary pitch rod is configured to mechanically correlate the secondary pitch angle of the plurality of propeller blades to the tilt angle of the propeller by translation along the rotational axis of the propeller.

12. The tilt apparatus of any of clauses 1 to 11, wherein the secondary pitch rod comprises a hollow tube surrounding the primary pitch control.

13. The tilt apparatus of any of clauses 1 to 12, further comprising:
a cam coupled to the second frame and configured to rotate when the tilt motor tilts the second frame;
wherein a linear translation of the secondary pitch rod is actuated by rotation of the cam.

14. The tilt apparatus of any of clauses 1 to 13, further comprising:
a fork plate coupled to the second frame and configured to be moved when the tilt motor tilts the second frame;
wherein a linear translation of the secondary pitch rod is actuated by movement of the fork plate.

15. The tilt apparatus of any of clauses 1 to 14, wherein the secondary pitch rod passes through a central shaft of the motor assembly.

16. The tilt apparatus of any of clauses 1 to 15, further comprising:
a spring seat coupled to the second frame, wherein the spring seat is separated from the secondary pitch rod by a gap.

17. The tilt apparatus of clause 16, wherein the plurality of propeller blades is configured to be set to the secondary pitch angle when the gap is closed.

18. The tilt apparatus of clause 16, further comprising a detector configured to detect when the gap is closed.

19. The tilt apparatus of any of clauses 1 to 18, further comprising a detector configured to detect one of a failure of the primary pitch control or an activation of the secondary pitch rod.

20. The tilt apparatus of clause 19, wherein the detector is configured to detect the one of the failure of the primary pitch control or the activation of the secondary pitch rod by detecting a pitch angle of the blades.

21. The tilt apparatus of clause 19, wherein the detector is configured to detect one of the failure of the primary pitch control or the activation of the secondary pitch rod by detecting a change in one of propeller speed and propeller torque.

22. The tilt apparatus of any of clauses 1 to 21, wherein:
for tilt angles below sixty degrees, a difference between the primary pitch angle and the secondary pitch angle is from one degree to twenty degrees.

23. The tilt apparatus of any of clauses 1 to 22, wherein:
for tilt angles below twenty-five degrees, a difference between the primary pitch angle and the secondary pitch angle is from one degree to fifteen degrees.

24. The tilt apparatus of any of clauses 1 to 23, wherein:
the plurality of propeller blades is set to the primary pitch angle during normal operation, and
the plurality of propeller blades is set to the secondary pitch angle when the primary pitch control fails to maintain the plurality of propeller blades at the primary pitch angle.

25. The tilt apparatus of any of clauses 1 to 24, wherein the secondary pitch rod comprises one of a hydraulic piston or a hydraulic tube.

26. A tilt method of a vertical takeoff and landing (VTOL) craft, comprising:
tilting a second frame of a tilt apparatus with respect to a first frame of the tilt apparatus between a lift configuration and a cruise configuration, the second frame being moveably coupled to the first frame;
controlling a primary pitch angle of a plurality of propeller blades of the tilt apparatus using a primary pitch control; and
mechanically correlating a secondary pitch angle of the plurality of propeller blades to a tilt angle of the tilt apparatus using a secondary pitch rod;
wherein the tilt apparatus comprises:
the first frame;
the second frame;
a propeller coupled to the second frame, the propeller comprising the plurality of propeller blades having a variable pitch;
a motor assembly coupled to the second frame and configured to rotate the propeller;
a tilt motor configured to tilt the second frame with respect to the first frame between the lift configuration and the cruise configuration;
the primary pitch control; and
the secondary pitch rod.

27. The tilt method of clause 26, wherein the primary pitch control comprises one of an electric actuator, a hydraulic actuator, a propeller governor, or a pitch rod.

28. The tilt method of clause 26 or 27, wherein the primary pitch control comprises a primary pitch rod.

29. The tilt method of clause 28, wherein the primary pitch rod is configured to mechanically correlate the primary pitch angle of the plurality of propeller blades to the tilt angle of the propeller.

30. The tilt method of clause 28, wherein:
the primary pitch rod or the secondary pitch rod are concentrically arranged.

31. The tilt method of clause 30, wherein the secondary pitch rod comprises a hollow tube surrounding the primary pitch rod.

32. The tilt method of clause 28, further comprising:
a cam coupled to the second frame and configured to rotate when the tilt motor tilts the second frame;
wherein a linear translation of one of the primary pitch rod or the secondary pitch rod is actuated by rotation of the cam.

33. The tilt method of clause 32, further comprising:
a second cam coupled to the second frame and configured to rotate when the tilt motor tilts the second frame;
wherein a linear translation of the other of the primary pitch rod or the secondary pitch rod is actuated by rotation of the second cam.

34. The tilt method of clause 32, further comprising:
a fork plate coupled to the second frame and configured to be moved when the tilt motor tilts the second frame;
wherein a linear translation of the other of the primary pitch rod or the secondary pitch rod is actuated by movement of the fork plate.

35. The tilt method of clause 28, wherein:
the primary pitch rod is coupled to the second frame by a first mechanical coupling;
the secondary pitch rod is coupled to the second frame by a second mechanical coupling;
a linear translation of the primary pitch rod is actuated by movement of the first mechanical coupling, and is independent of movement of the second mechanical coupling; and
a linear translation of the secondary pitch rod is actuated by movement of the second mechanical coupling, and is independent of movement of the first mechanical coupling.

36. The tilt method of clause 28, wherein:
the primary pitch rod is configured to mechanically couple the primary pitch angle of the plurality of propeller blades to the tilt angle of the propeller by translation along a rotational axis of the propeller; and
the secondary pitch rod is configured to mechanically couple the secondary pitch angle of the plurality of propeller blades to the tilt angle of the propeller by translation along the rotational axis of the propeller.

37. The tilt method of any of clauses 26 to 36, wherein the secondary pitch rod comprises a hollow tube surrounding the primary pitch control.

38. The tilt method of any of clauses 26 to 36, further comprising:
a cam coupled to the second frame and configured to rotate when the tilt motor tilts the second frame;
wherein a linear translation of the secondary pitch rod is actuated by rotation of the cam.

39. The tilt method of any of clauses 26 to 38, further comprising:
a fork plate coupled to the second frame and configured to be moved when the tilt motor tilts the second frame;
wherein a linear translation of the secondary pitch rod is actuated by movement of the fork plate.

40. The tilt method of any of clauses 26 to 39, wherein the secondary pitch rod passes through a central shaft of the motor assembly.

41. The tilt method of any of clauses 26 to 40, further comprising:
a spring seat coupled to the second frame, wherein the spring seat is separated from the secondary pitch rod by a gap.

42. The tilt method of clause 41, wherein the plurality of propeller blades is configured to be set to the secondary pitch angle when the gap is closed.

43. The tilt method of clause 41, further comprising a detector configured to detect when the gap is closed.

44. The tilt method of any of clauses 26 to 43, further comprising a detector configured to detect one of a failure of the primary pitch control or an activation of the secondary pitch rod.

45. The tilt method of clause 44, wherein the detector is configured to detect the one of the failure of the primary pitch control or the activation of the secondary pitch rod by detecting a pitch angle of the blades.

46. The tilt method of clause 44, wherein the detector is configured to detect one of the failure of the primary pitch control or the activation of the secondary pitch rod by detecting a change in one of propeller speed and propeller torque.

47. The tilt method of any of clauses 26 to 46, wherein:
for tilt angles below sixty degrees, a difference between the primary pitch angle and the secondary pitch angle is from one degree to twenty degrees.

48. The tilt method of any of clauses 26 to 47, wherein:
for tilt angles below twenty-five degrees, a difference between the primary pitch angle and the secondary pitch angle is from one degree to fifteen degrees.

49. The tilt method of any of clauses 26 to 48, wherein:
the plurality of propeller blades is set to the primary pitch angle during normal operation, and
the plurality of propeller blades is set to the secondary pitch angle when the primary pitch control fails to maintain the plurality of propeller blades at the primary pitch angle.

50. The tilt method of any of clauses 26 to 49, wherein the secondary pitch rod comprises one of a hydraulic piston or a hydraulic tube.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. A tilt apparatus of an aircraft, comprising:
a first frame;
a second frame moveably coupled to the first frame;
a propeller coupled to the second frame, the propeller comprising a plurality of propeller blades having a variable pitch;
a motor assembly coupled to the second frame and configured to rotate the propeller;
a tilt motor configured to tilt the second frame with respect to the first frame between a lift configuration and a cruise configuration;
a primary pitch control configured to control a primary pitch angle of the plurality of propeller blades; and
a secondary pitch rod configured to mechanically correlate a secondary pitch angle of the plurality of propeller blades to a tilt angle of the propeller.

2. The tilt apparatus of claim 1, wherein the primary pitch control comprises one of an electric actuator, a hydraulic actuator, a propeller governor, or a pitch rod.

3. The tilt apparatus of claim 1, wherein the primary pitch control comprises a primary pitch rod.

4. The tilt apparatus of claim 3, wherein the primary pitch rod is configured to mechanically correlate the primary pitch angle of the plurality of propeller blades to the tilt angle of the propeller.

5. The tilt apparatus of claim 3, wherein:
the primary pitch rod and the secondary pitch rod are concentrically arranged.

6. The tilt apparatus of claim 5, wherein the secondary pitch rod comprises a hollow tube surrounding the primary pitch rod.

7. The tilt apparatus of claim 3, further comprising:
a cam coupled to the second frame and configured to rotate when the tilt motor tilts the second frame;
wherein a linear translation of one of the primary pitch rod or the secondary pitch rod is actuated by rotation of the cam.

8. The tilt apparatus of claim 7, further comprising:
a second cam coupled to the second frame and configured to rotate when the tilt motor tilts the second frame;
wherein a linear translation of the other of the primary pitch rod or the secondary pitch rod is actuated by rotation of the second cam.

9. The tilt apparatus of claim 7, further comprising:
a fork plate coupled to the second frame and configured to be moved when the tilt motor tilts the second frame;
wherein a linear translation of the other of the primary pitch rod or the secondary pitch rod is actuated by movement of the fork plate.

10. The tilt apparatus of claim 3, wherein:
the primary pitch rod is coupled to the second frame by a first mechanical coupling;
the secondary pitch rod is coupled to the second frame by a second mechanical coupling;

a linear translation of the primary pitch rod is actuated by movement of the first mechanical coupling, and is independent of movement of the second mechanical coupling; and a linear translation of the secondary pitch rod is actuated by movement of the second mechanical coupling, and is independent of movement of the first mechanical coupling.

11. The tilt apparatus of claim 3, wherein:
the primary pitch rod is configured to mechanically correlate the primary pitch angle of the plurality of propeller blades to the tilt angle of the propeller by translation along a rotational axis of the propeller; and
the secondary pitch rod is configured to mechanically correlate the secondary pitch angle of the plurality of propeller blades to the tilt angle of the propeller by translation along the rotational axis of the propeller.

12. The tilt apparatus of claim 1, wherein the secondary pitch rod comprises a hollow tube surrounding the primary pitch control.

13. The tilt apparatus of claim 1, further comprising:
a cam coupled to the second frame and configured to rotate when the tilt motor tilts the second frame;
wherein a linear translation of the secondary pitch rod is actuated by rotation of the cam.

14. The tilt apparatus of claim 1, further comprising:
a fork plate coupled to the second frame and configured to be moved when the tilt motor tilts the second frame;
wherein a linear translation of the secondary pitch rod is actuated by movement of the fork plate.

15. The tilt apparatus of claim 1, wherein the secondary pitch rod passes through a central shaft of the motor assembly.

16. The tilt apparatus of claim 1, further comprising:
a spring seat coupled to the second frame, wherein the spring seat is separated from the secondary pitch rod by a gap.

17. The tilt apparatus of claim 16, wherein the plurality of propeller blades is configured to be set to the secondary pitch angle when the gap is closed.

18. The tilt apparatus of claim 16, further comprising a detector configured to detect when the gap is closed.

19. The tilt apparatus of claim 1, further comprising a detector configured to detect one of a failure of the primary pitch control or an activation of the secondary pitch rod.

20. The tilt apparatus of claim 19, wherein the detector is configured to detect the failure of the primary pitch control or the activation of the secondary pitch rod by detecting a pitch angle of the blades.

21. The tilt apparatus of claim 19, wherein the detector is configured to detect the failure of the primary pitch control or the activation of the secondary pitch rod by detecting a change in one of propeller speed or propeller torque.

22. The tilt apparatus of claim 1, wherein:
for tilt angles below sixty degrees, a difference between the primary pitch angle and the secondary pitch angle ranges from one degree to twenty degrees.

23. The tilt apparatus of claim 1, wherein:
for tilt angles below twenty-five degrees, a difference between the primary pitch angle and the secondary pitch angle ranges from one degree to fifteen degrees.

24. The tilt apparatus of claim 1, wherein:
the plurality of propeller blades is set to the primary pitch angle during normal operation, and
the plurality of propeller blades is set to the secondary pitch angle when the primary pitch control fails to maintain the plurality of propeller blades at the primary pitch angle.

25. The tilt apparatus of claim 1, wherein the secondary pitch rod comprises one of a hydraulic piston or a hydraulic tube.

26. A tilt method of a vertical takeoff and landing (VTOL) craft, comprising:
tilting a second frame of a tilt apparatus with respect to a first frame of the tilt apparatus between a lift configuration and a cruise configuration, the second frame being moveably coupled to the first frame;
controlling a primary pitch angle of a plurality of propeller blades of the tilt apparatus using a primary pitch control; and
mechanically correlating a secondary pitch angle of the plurality of propeller blades to a tilt angle of the tilt apparatus using a secondary pitch rod;
wherein the tilt apparatus comprises:
the first frame;
the second frame;
a propeller coupled to the second frame, the propeller comprising the plurality of propeller blades having a variable pitch;
a motor assembly coupled to the second frame and configured to rotate the propeller;
a tilt motor configured to tilt the second frame with respect to the first frame between the lift configuration and the cruise configuration;
the primary pitch control; and
the secondary pitch rod.

27. The tilt method of claim 26, further comprising:
a cam coupled to the second frame and configured to rotate when the tilt motor tilts the second frame;
wherein a linear translation of the secondary pitch rod is actuated by rotation of the cam.

28. The tilt method of claim 26, further comprising:
a fork plate coupled to the second frame and configured to be moved when the tilt motor tilts the second frame;
wherein a linear translation of the secondary pitch rod is actuated by movement of the fork plate.

29. The tilt method of claim 26, wherein:
for tilt angles below twenty-five degrees, a difference between the primary pitch angle and the secondary pitch angle is from one degree to fifteen degrees.

30. The tilt method of claim 26, wherein:
the plurality of propeller blades is set to the primary pitch angle during normal operation, and
the plurality of propeller blades is set to the secondary pitch angle when the primary pitch control fails to maintain the plurality of propeller blades at the primary pitch angle.

* * * * *